Dec. 1, 1931.  R. G. VAN DUYN  1,834,557
AUTOMOBILE SIGNAL
Filed Oct. 6, 1930
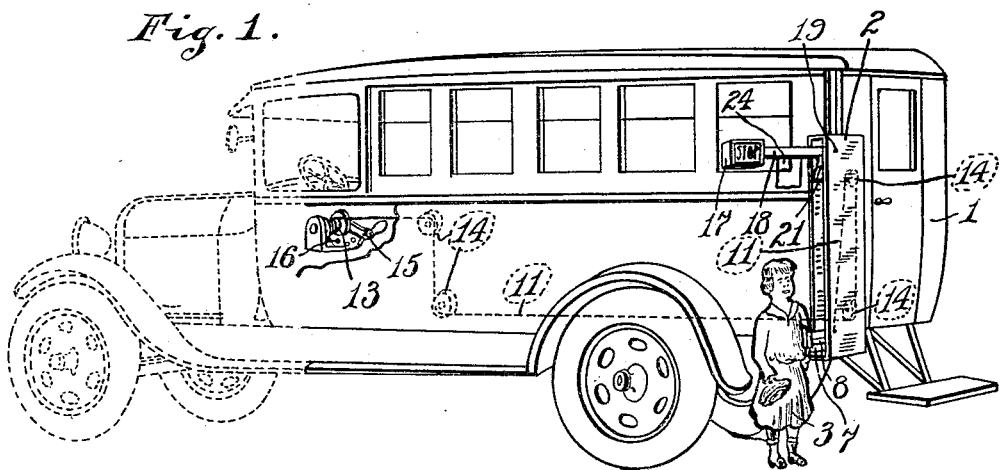
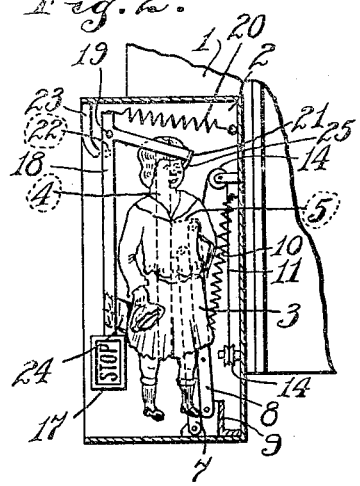
INVENTOR.
Robert Grover Van Duyn,
BY
Hood + Hahn
ATTORNEYS Patented Dec. 1, 1931

1,834,557

UNITED STATES PATENT OFFICE

ROBERT GROVER VAN DUYN, OF GREENFIELD, INDIANA

AUTOMOBILE SIGNAL

Application filed October 6, 1930. Serial No. 486,553.

The present invention relates to improvements in signaling devices for automobiles, and particularly for school buses, and the like. An object of the invention is to provide a signaling device for such vehicles which will project a figure, preferably the figure of a child, into a position in the roadway where it can be seen by a car approaching from either direction. The figure is adapted to be projected into such position when the vehicle is stopped for loading or unloading, and is adapted to be retracted into a housing at other times. Further objects of the invention will appear as the description proceeds.

To the accomplishment of the above and related objects, my invention may be embodied in the form illustrated in the accompanying drawings, it being understood, however, that the drawings are illustrative only, and that change may be made in the specific mechanism illustrated, so long as the scope of the appended claims is not violated.

In said drawings,

Fig. 1 is a perspective view of a bus having my invention applied thereto;

Fig. 2 is a longitudinal section through the signal carrying casing, showing the mechanism therein;

Fig. 3 is a view similar to Fig. 2, but showing the signal means in projected position;

Fig. 4 is a top plan, partly in section, of the signal mechanism;

Fig. 5 is a broken horizontal section of a detail;

Fig. 6 is a sectional view of a switch for controlling an element of the signaling mechanism; and Fig. 7 is a central section through the winding mechanism.

Referring more particularly to the drawings, it will be seen that I have illustrated a vehicle 1 of the general character of a school bus. Upon this vehicle, and preferably adjacent the loading door thereof, there is mounted a signal box 2. In the illustrated form of bus, the loading door is at the rear of the vehicle, and in this form, the box 2 is mounted on the left-hand rear corner of the vehicle. A signaling figure is mounted for projection from and retraction into the box 2, said figure comprising a pair of sheet metal plates 3, each enameled and decorated on its one surface to simulate the figure of a school child. The two plates are mounted upon an intermediate upright bar 4 to which is secured a channel member 5, the same being attached to the upright 4 by screws 6, or the like.

A pair of links 7 and 8 have their one ends pivoted at angularly spaced points on the channel member 5, and have their opposite ends pivoted at similarly spaced points on a second channel member 9 suitably secured adjacent the bottom of the box 2. As will be obvious, the arrangement of the channel members 5 and 9 and the links 7 and 8 is such as to maintain the figure 3 always in a vertical position as the links 7 and 8 are swung about their pivotal mountings on the channel member 9.

A contractible spring 10 has its one end anchored in the box 2 and has its lower end attached to the link 8, tending to rotate the link in a clockwise direction about its pivot to the position illustrated in Fig. 2. As will be obvious, the weight of the figure is so suspended as to tend to cause counter-clockwise rotation of the links 7 and 8 to the full-line position of Fig. 3. The strength of the spring 10 is not sufficient to overcome the gravitative effect of the figure 3, or even to hold the figure in the position of Fig. 2, but said spring is supplied merely to assist in the retracting movement of the figure. The operating means for the figure comprises a cable 11 secured to the link 8 at a point 12 within the confines of the box 2. In the illustrated embodiment, the cable 11 is led over a series of pulleys 14 through the floor of the bus and to a drum 13 mounted adjacent the driver's seat. It will be obvious that the cable may be led to any position in the bus for operation by any desired person, and that the operating end thereof may be controlled either by the drum illustrated or by any other suitable means. In the illustrated embodiment, the drum 13 is mounted on a shaft which is rotatable through the medium of the handle in which is mounted a locking pin 15 adapted to take into any one of a series of openings 16 in a stationary plate, for the purpose of maintaining the drum in any desired adjusted position whereby the figure may be maintained in any one of a series of projected positions.

I prefer to provide also a light signal which, in the illustrated embodiment, takes the form of a signal housing 17 adapted to contain an electric light bulb and provided with the usual warning lenses on its opposite faces. The signal housing is carried on the free end of an arm 18 pivoted at 19 within the housing 2. In the illustrated embodiment, the arm 18 comprises a pair of metal strips which may or may not constitute the arms of a U-shaped member. Of course it will be obvious that the arm 18 might be formed as a single wooden block or as any other form of solid member which, in the position of Fig. 2, would act as a substantial closure for the open edge of the box 2. A contractile spring 20 has its one end anchored within the box 2 and has its opposite end secured to the inner end 18' of the arm 18. As will be obvious, the tendency of the spring 20 is to move the arm 18 into the position of Fig. 3. A stirrup 21 is secured to or formed integral with the arm 18 and depends therefrom, carrying at its free end a projection or foot 25 adapted to enter the space between the two figure plates 3 and to engage the upright 4.

A spring-pressed contact member 22 connected to one side of a source of electrical energy is mounted on but insulated from the arm 18, while a contact plate 23 connected to the opposite side of the source of energy is mounted on but insulated from the box 2, the arrangement being such that the contact element 22 engages the toe of the plate 23 just as the signal housing 17 emerges from the box 2, whereby the light bulb within the housing 17 is energized at all times when said housing 17 is without the box 2.

Preferably, an American flag indicated at 24 is hung from the arm 18, as indicated.

The operation of the device will be obvious, but may be outlined as follows. Presuming that the parts are in the position of Fig. 2, and that the driver wishes to project his signal, he releases the locking pin 15 from its engagement in one of the apertures 16 and permits the drum to turn to unwind the cable 11. The gravitative effect of the figure 3 will cause counter-clockwise rotation of the links 7 and 8 to bring the figure 3 into the position illustrated in Figs. 1 and 3. The spring 20 will cause the arm 18 to be projected to the position of Fig. 3, the contact elements 22 and 23 cooperating to illuminate the signal 17. This operation projects the figure 3 into a position spaced laterally from the left-hand side of the bus and clearly visible to cars approaching along the road from either direction. It also brings the signal 17 into a position visible from either direction.

When the loading or unloading of the bus has been completed and the driver is ready to proceed he rotates the drum 13 to wind in the cable 11. Assisted by the spring 10, the cable 11 causes clockwise rotation of the links 7 and 8, bringing the elements into the dotted-line position of Fig. 3. At this point, the upright 4 engages the projection 25 on the stirrup 21 and, as the figure is moved farther into the box 2, such engagement of the upright 4 with the projection 25 enforces counter-clockwise rotation of the arm 18 against the tension of the spring 20. Continued rotation of the drum 13 will bring the parts into the position of Fig. 2, the contact member 22 leaving the contact plate 23 just as the housing 17 enters the box 2.

I claim as my invention:

1. The combination with a vehicle, of a signal therefor comprising a figure of a child mounted on said vehicle in a substantially upright position, and means for projecting said figure into a position in which the feet of said figure are disposed substantially upon the roadway, and in which said figure is visible from an approaching vehicle.

2. The combination with a vehicle, of a signal therefor comprising a figure of a child mounted on the rear end of the vehicle in a substantially upright position, and means for projecting said figure into a position in which the feet of said figure are disposed substantially upon the roadway, and in which said figure is visible from points in front of said vehicle and from points in the rear of said vehicle.

3. The combination with a vehicle adapted to stop upon a roadway with its one side close to an edge of the roadway, of a signal therefor comprising a figure mounted on said vehicle and projectable into a position in the roadway spaced outwardly from the opposite side of said vehicle.

4. The combination with a vehicle, of a signal therefor mounted on said vehicle comprising a figure, means for supporting said figure in a vertical position and means for projecting said figure beyond the side of the vehicle while maintaining the same in said vertical position throughout the projecting movement thereof.

5. The combination with a vehicle, of a signaling means therefor including a figure mounted on the rear end of said vehicle, an illuminated signal likewise mounted on the rear end of said vehicle, means for projecting said figure while in its vertical position beyond the side of the vehicle, and means affected by the projection of said figure for projecting said illuminated signal from the side of the vehicle.

In witness whereof, I, ROBERT GROVER VAN DUYN have hereunto set my hand at Indianapolis, Indiana, this 2nd day of October, A. D. one thousand nine hundred and thirty.

ROBERT GROVER VAN DUYN.